(12) United States Patent
Simbirdi

(10) Patent No.: US 8,653,348 B2
(45) Date of Patent: Feb. 18, 2014

(54) FOOTPRINT INDICATION KIT FOR PERCUSSION INSTRUMENTS

(71) Applicant: Emir Simbirdi, San Francisco, CA (US)

(72) Inventor: Emir Simbirdi, San Francisco, CA (US)

(*) Notice: Subject to any disclaimer, the term of this patent is extended or adjusted under 35 U.S.C. 154(b) by 0 days.

(21) Appl. No.: 13/754,696

(22) Filed: Jan. 30, 2013

(65) Prior Publication Data

US 2013/0133507 A1   May 30, 2013

Related U.S. Application Data

(63) Continuation of application No. 12/726,706, filed on Mar. 18, 2010, now Pat. No. 8,507,780.

(60) Provisional application No. 61/161,733, filed on Mar. 19, 2009.

(51) Int. Cl.
  *G09B 15/00* (2006.01)
(52) U.S. Cl.
  USPC ............................................. 84/477 R
(58) Field of Classification Search
  USPC ............................................. 84/477 R
  See application file for complete search history.

(56) References Cited

U.S. PATENT DOCUMENTS

| | | | |
|---|---|---|---|
| 5,417,428 A | 5/1995 | Warren | |
| 5,478,082 A | 12/1995 | De Knight et al. | |
| 5,492,328 A | 2/1996 | Lundquist | |
| 5,642,880 A | 7/1997 | Wiseman et al. | |
| 2003/0115767 A1* | 6/2003 | Wedekind et al. | 33/566 |
| 2007/0235605 A1* | 10/2007 | Voelz | 248/188.8 |

* cited by examiner

*Primary Examiner* — Christopher Uhlir
(74) *Attorney, Agent, or Firm* — Alleman Hall McCoy Russell & Tuttle LLP

(57) ABSTRACT

Embodiments are disclosed that relate to facilitating the reproducible placement of percussive instruments, such as drums, relative to one another. For example, one disclosed embodiment provides a footprint indication kit for percussion instruments. The footprint indication kit comprises a set of marking strips configured to indicate a periphery of a footprint of a percussion instrument, the set of marking strips including two or more marking strips having a first side including a connecting material configured to removably engage a complementary connecting material on a drum mat, and the two or more marking strips including at least one of a marking strip having one or more curved edges and a rectangular marking strip.

19 Claims, 2 Drawing Sheets

FOOTPRINT INDICATION KIT FOR PERCUSSION INSTRUMENTS

CROSS-REFERENCE TO RELATED APPLICATIONS

This application is a continuation of U.S. patent application Ser. No. 12/726,706, filed Mar. 18, 2010 and entitled "Footprint Indication Kit for Percussion Instruments," which claims priority from U.S. Provisional Patent Application No. 61/161,733, filed Mar. 19, 2009 and entitled "Footprint Indication Kit for a Drum Set," the disclosure of both of which are hereby incorporated by reference in their entirety and for all purposes.

BACKGROUND

Drumming is a very physical activity involving major and fine motor skills. The positioning or placement of percussion instruments included in a drum kit is important to a drum player's performance. Over time during practice, a drummer may precisely adjust or "fine tune" the positioning of the percussion instruments, hardware and equipment (e.g., high hats, cymbals stands, tom-tom stands, bass drums, pedals, etc.), in an attempt to find an ergonomic and desirable placement of each instrument. The repeated placement of the percussion instruments in a desired position may enable a drummer to deliver a more consistent performance.

To maintain such consistency, a drummer may attempt to duplicate a practice setup (i.e., relative positions and orientations of percussion instruments during practice) when the drum kit is moved to another location, for example, for a performance. Duplicating the practice setup at a new location may be challenging when using visual memory and recall to position each percussion instrument. Furthermore, even slight deviations in the practice setup may adversely affect the drummer's performance.

Time constraints may also come into play when duplicating the practice setup in a new location. For example, music venues may impose predetermined schedules for equipment load-in, stage preparation, and sound check for each band prior to the start of a performance. Therefore, the drummer may become rushed and incorrectly position percussion instruments when attempting the duplicate the practice setup under time constraints. This may adversely affect the duplication of the practice setup and therefore the drummer's performance at the venue.

Some drummers may place tape, such as gaff tape, duct tape, etc., on a drum mat (which also may be referred to as a drum rug) to provide visual cues for replication of a practice setup. However, tape is not durable and may become worn out over time. Moreover, it may be difficult and in some cases infeasible to reposition the tape due to the adhesive properties of the tape. Thus even slight adjustments in the drum setup may necessitate a drummer to use new strips of tape, taking extra time and energy. Additionally, tape may not fully adhere to a drum mat due to various environmental conditions (e.g., heat, humidity) as well as the properties of the tape's adhesive. Therefore, tape that is applied to a drum mat may be shifted during transportation, setup, etc., leading to incorrect drum placement, thereby negatively impacting a drummer's performance.

SUMMARY

Accordingly, various embodiments are disclosed herein that relate to facilitating the reproducible placement of percussive instruments, such as drums, relative to one another. For example, one disclosed embodiment provides a footprint indication kit for percussion instruments. The footprint indication kit comprises a set of marking strips configured to indicate a periphery of a footprint of a percussion instrument, the set of marking strips including two or more marking strips having a first side including a connecting material configured to removably engage a complementary connecting material on a drum mat, and the two or more marking strips including at least one of a marking strip having one or more curved edges and a rectangular marking strip.

Another disclosed embodiment provides a footprint indication kit comprising a first set of marking strips including two or more rectangular marking strips configured to indicate a periphery of a footprint of a foot pedal, each marking strip included in the first set having a first side comprising a connecting material configured to removably engage a complementary connecting material on a drum mat; and a second set marking strips configured to indicate a periphery of a footprint of drum stand having three or more feet, the second set of marking strips including two or more marking strips having one or more curved edges and a first side comprising a connecting material configured to removably engage a complementary connecting material on the drum mat.

Another disclosed embodiment provides a footprint indication kit comprising a first set of marking strips including two or more rectangular marking strips configured to indicate a periphery of a footprint of a first foot pedal; a second set of marking strips including two or more marking strips having one or more curved edges and configured to indicate a periphery of a footprint of first drum stand having three or more feet; a third set of marking strips including two or more rectangular marking strips configured to indicate a periphery of a footprint of a second foot pedal; and a fourth set of marking strips including two or more marking strips having one or more curved edges and configured to indicate a periphery of a footprint of second drum stand having three or more feet. Each of the marking strips included in the first, second, third, and fourth sets of marking strips include a first side comprising a connecting material configured to removably engage a complementary connecting material on the drum mat.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A footprint indication kit by which the specific placement of percussion instruments can be clearly marked on a transportable drum mat using marking strips is disclosed herein. The marking strips may be applied, removed, adjusted, and replaced as needed on a drum mat or other suitable surface, yet when placed on a drum mat connect securely to the drum mat during transport, drum kit set up, etc. The marking strips may be used as visual guides allowing the percussion instruments to be placed in a desired location. The marking strips are configured to removably engage a connecting material on a surface of a drum mat and remain in place when the drum mat is rolled up for transport and unrolled at the location where the next drum setup will take place. In this way, a drummer may be able to outline a desired drum setup optimized during practice, and then quickly and accurately reproduce the desired drum setup in different locations (e.g., venues, recording sessions, bars, etc.). The term "drum setup" as used herein refers to the relative position and orientation of one or more percussion instruments and/or percussion instrument components (e.g. a bass drum pedal) on a drum mat.

Figure 1:
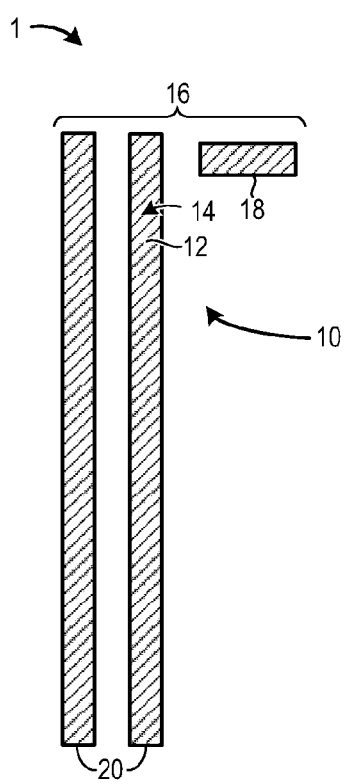
FIG. 1 shows an embodiment of a footprint indication kit including plurality of marking strips, and illustrates a first side of the marking strips.
Figure 1:
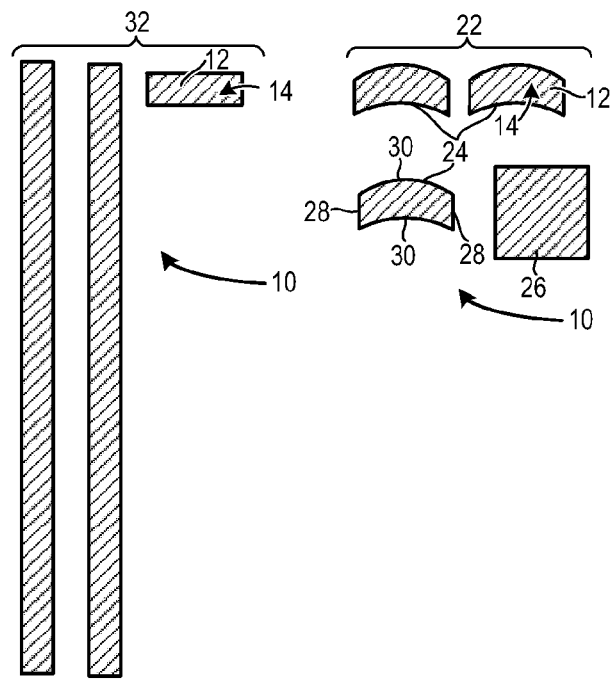

FIG. 1 shows an example embodiment of a footprint indication kit 1 for percussion instruments. The footprint indication kit 1 comprises a plurality of marking strips 10 each having a first side 12 comprising a connecting material 14 configured to removably engage a complementary connecting material on a drum mat. In some embodiments, the connecting material on the first side of the marking strips may comprise hook fasteners and the complementary connecting material on the drum mat may be loop fasteners, or visa-versa. The connecting material may substantially span the first side of the marking strip in some embodiments, while in other embodiments the connecting material may be included on only a portion of the first side of the marking strips. In other embodiments, any other suitable complementary connecting materials may be used. It will be appreciated that in some embodiments the marking strips may also include edging to enhance the durability of the marking strips.

The plurality of marking strips of the embodiment of FIG. 1 comprises one or more sets of marking strips, wherein each set of marking strips is configured to indicate a periphery of a footprint of a particular corresponding percussion instrument. Thus, a drummer may place each marking strip of a marking strip set on a drum mat to mark the outline of the corresponding percussion instrument. The percussion instrument may then be removed from the mat and the drum mat may be transported to another location, where the drummer may quickly and accurately place the percussion instrument in the same location on the drum mat using the visual cues provided by the marking strips.

A first such set of marking strips is illustrated at 16. The depicted first set of marking strips 16 is configured to indicate a periphery of a footprint of a foot pedal, such as that used in conjunction with a bass drum, a high hat, etc. The first set of marking strips 16 as depicted includes three marking strips: one shorter rectangular marking strip 18 and two longer rectangular marking strips 20. The shorter marking strip 18 is configured to mark a short side of a drum kit pedal, and the two longer marking strips are configured to mark the long sides of a drum kit pedal. However, it will be understood that a marking strip set for a drum pedal may include any other suitable number and configuration of strips. For example, an additional shorter strip may be included to allow all four sides of a drum pedal to be marked or the first set may comprise one shorter and one longer rectangular marking strip. Likewise, two or more "corner" shaped strips configured to mark the corners of a foot pedal may be provided in lieu of, or in addition to, the shorter rectangular marking strip 18 and the longer rectangular marking strips 20. Further still in other embodiments the size of the marking strips may be different from that shown. For example, all of the marking strips included in the first set may have a substantially identical height and width.

The rectangular marking strips of the first set of marking strips (i.e., the shorter and longer rectangular marking strips 18 and 20) may have any suitable dimensions. For example, in some embodiments, these strips may each have a width greater than or equal to 0.75 inches. In other embodiments, the strips may have any other suitable width, including widths less than 0.75 inches. Additionally, in some embodiments, the length of the shorter rectangular marking strip 18 may be greater than or equal to 2 inches and the length of the longer marking strips 20 may be greater than or equal to 8 inches. Marking strips of this size may help to prevent the marking strips from becoming unfastened when moving the drum mat around, such as when rolling the drum mat up for transport, due to the relatively large number of hook fasteners in contact with the drum mat, enabling accurate replication of a desired drum setup at various locations. However, it will be appreciated the marking strips included in the first set of marking strips may have any other suitable dimensions, including dimensions inside and outside of these ranges.

Footprint indication kit 1 also includes a second set of marking strips 22. As depicted, the second set of marking strips 22 is configured to indicate a periphery of a footprint of drum stand having three or more feet. Such a drum stand may be used to hold a variety of drum components. Examples include, but are not limited to, snare drums, high hats, bass drums, cymbals, tom-toms, etc.

The depicted second set of marking strips 22 includes three curved marking strips 24 and a square marking strip 26. The curved marking strips 24 are each configured to mark a periphery of a single foot of the drum stand, and the square marking strip 26 is configured to label the specific drum piece outlined by the curved market strips 24. It will be appreciated that a set of marking strips for marking a drum stand periphery may include any other suitable number and configuration of marking strips.

In the depicted embodiments the curved marking strips have two opposing straight edges 28 and two opposing curved edges 30. However, in other embodiments, curved marking strips 24 may include a single curved edge, rather than the two parallel curved edges as shown, or may include three, four, or even more, curved edges, depending upon the shape of the marking strips.

The curved marking strips 24 may have any suitable dimensions. For example, in the depicted embodiment, the straight edges 28 of the curved marking strips 24 have a length greater than or equal to 0.75 inches, and the curved edges 30 have a length greater than or equal to 2 inches. Using marking strips of this size may help to prevent the marking strips from becoming disengaged when moving the drum mat around, such as when rolling the drum mat up for transport, or when walking on the drum mat. However, in other embodiments, the curved marking strips may have any other suitable size, including but not limited to sizes inside and outside of the stated ranges.

The square marking strip 26 is configured to mark a central location of the drum stand, providing the drummer with an additional visual cue which enables a drummer to quickly and accurately set up their percussion instruments. In the depicted embodiment, the square marking strip 26 has the dimensions of 2 inches by 2 inches. However, in other embodiments, the square marking strip may have any other suitable geometry and/or size.

FIG. 1 also depicts a third set of marking strips 32 configured to indicate a periphery of a footprint of a foot pedal.

Thus, footprint indication kit 1 includes two sets of marking strips for pedals (e.g. first set 16 and second set 32), allowing a user to mark positions of both a bass drum pedal and a high hat pedal, for example. As depicted, the third set of marking strips 32 includes marking strips that are substantially identical in size and shape to the second set of marking strips, but may have any other suitable shape and/or size, depending upon the pedal or other drum kit component intended to be marked by the third set of marking strips. For example, as mentioned above, the third set of marking strips may include an additional shorter rectangular strip and/or two or more "corner" shaped marking strips.

It will be appreciated that a footprint indication kit may include any suitable number and configuration of marking strip sets, depending upon the number and type of percussion instrument pieces included in a percussion instrument set for which the indication kit is intended. For example, a footprint indication kit may include a fourth set of marking strips for a drum stand so that a location of an additional cymbal, floor tom, etc. may be marked on a drum mat.

Figure 2:
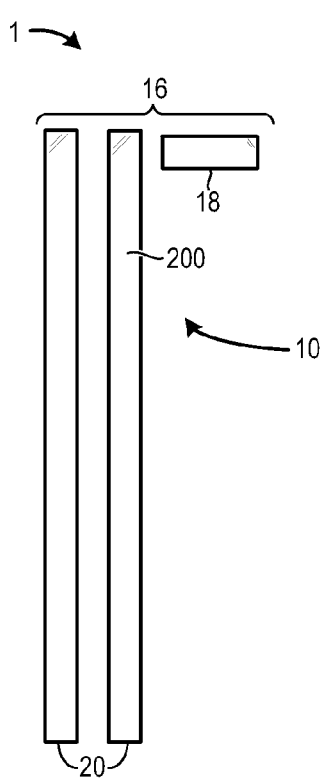
FIG. 2 shows an illustration of a second side of the plurality of marking strips of the embodiment of FIG. 1.
Figure 2:
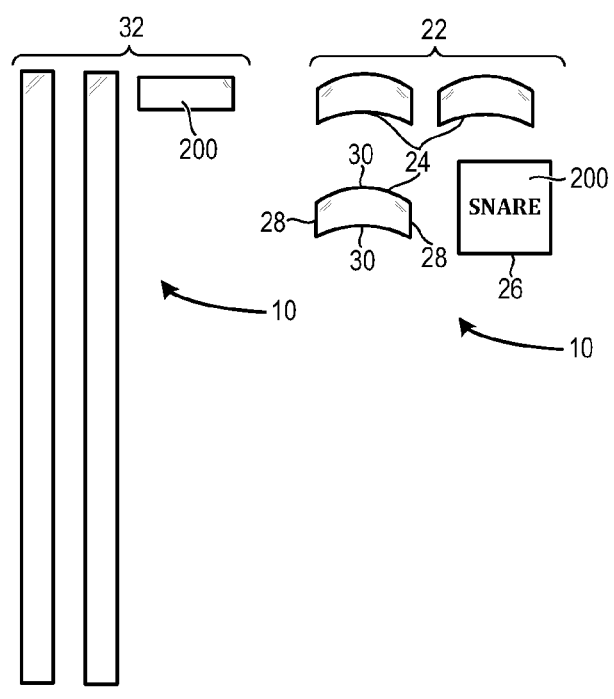

FIG. 2 shows a view of the second sides 200 of the marking strips of footprint indication kit 1. The second side of the marking strips may be constructed out of a non-looped material to avoid having the second sides of the marking strips inadvertently connect to the drum mat when the drum mat is rolled up, etc. However, in other embodiments the second sides of the marking strips may be constructed out of a connecting material such as hook or loop fasteners.

In some embodiments, one or more marking strips of a set of marking strips may include indicia visually indicative of a percussion instrument that is marked by that set of strips. Examples of such indicia may include, but are not limited to, alphanumeric symbol(s), icon(s), image(s), etc. For example, FIG. 2 shows the square marking strip 26 inscribed with the words "snare drum", thereby indicating that the surrounding marking strips show the locations of the snare drum stand feet. Further, in other embodiments, a marking strip may include any other suitable graphics, such as a depiction of a particular percussion instrument (e.g., drum, cymbal, etc.).

Figure 3:
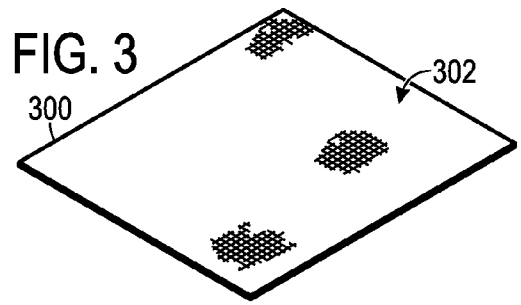
FIG. 3 shows an illustration of an embodiment of a drum mat.

FIG. 3 shows an embodiment of a drum mat 300 that includes a layer of a connecting material 302 on one side. The connecting material 302 is configured to removably engage, or otherwise connect to, a complementary connecting material on the marking strips of the footprint indication kit 1. For example, in some embodiments, the connecting material may be a material with which hook fasteners may removably engage. Examples of such materials include, but are not limited to, a woven fabric, loop fasteners, etc. Likewise, in other embodiments, the drum mat may comprise hook fasteners which loop fasteners on the marking strips may removably engage. In the depicted embodiment, the connecting material covers substantially all of the depicted side of the drum mat, but it will be understood that, in some embodiments, the connecting material may cover only a portion of the side of drum mat. It will further be understood that the drum mat may include in some embodiments additional layers, such as a base layer (not shown) that forms a side of the drum mat opposite the depicted side, as well as edging (not shown). In some embodiments, the base layer may be constructed out of a suitable material having a high friction coefficient when in contact with an underlying floor or stage, preventing the drum mat from sliding around.

Figure 4:
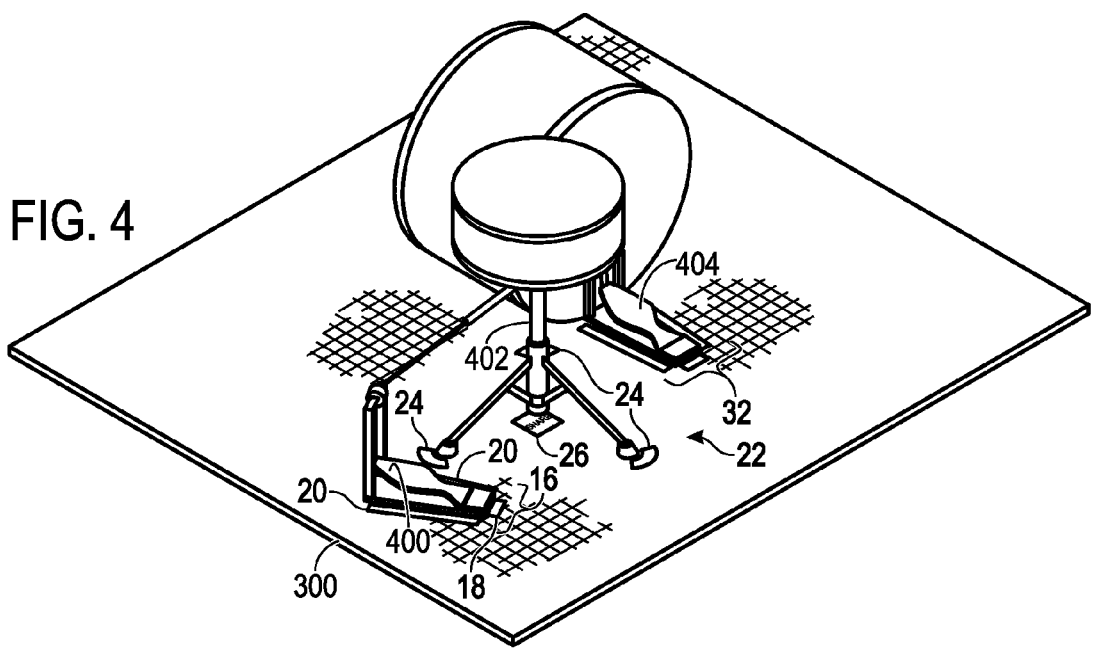
FIG. 4 shows an embodiment of a footprint indication kit and a drum kit placed on the drum mat of FIG. 3.
Figure 5:
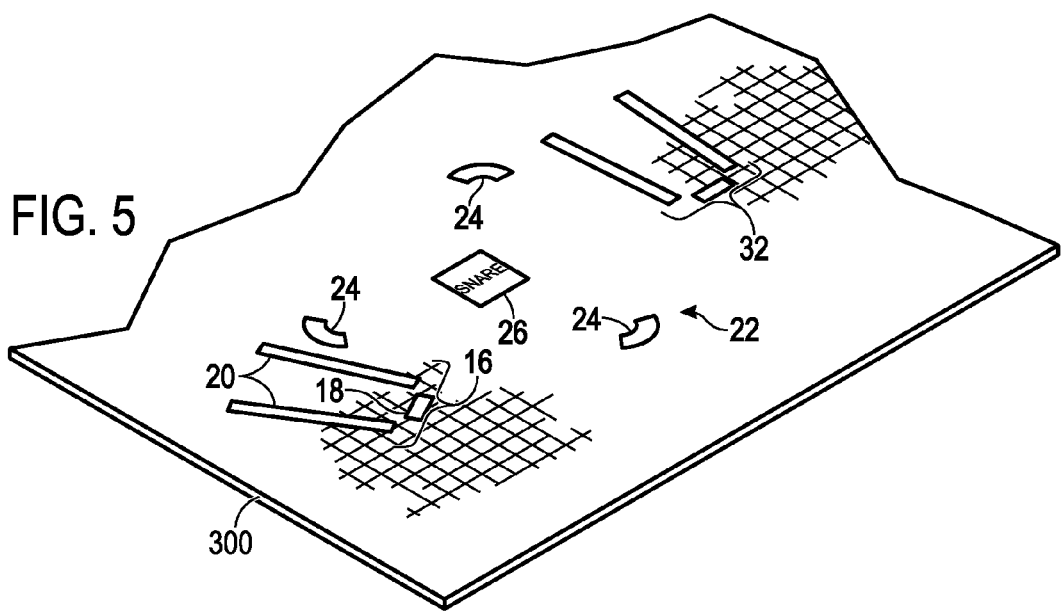
FIG. 5 shows the drum mat and footprint indication kit of FIG. 4 with the drum kit removed.

FIG. 4 shows drum mat 300 with a drum kit placed thereon. The depicted drum kit includes a first foot pedal 400, a drum stand 402 holding a snare drum, and a second foot pedal 404. As shown, the marking strips of footprint indication kit 1 are placed around periphery of various pieces of the drum kit, thereby outlining the periphery of the pieces. More specifically, the first set of marking strips 16 outlines the periphery of a footprint of the first foot pedal 400, the second set of marking strips 22 outlines the periphery of the drum stand 402, and the third set of marking strips 32 outlines the periphery of the second foot pedal 404. By placing the strips on the drum mat after the drum piece positions have been optimized during practice, the footprint indication kit may be used to quickly and easily replicate a practice drum setup, for example, at a performance venue.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A footprint indication kit for percussion instruments, the footprint indication kit comprising:
a set of marking strips configured to indicate a periphery of a footprint of a percussion instrument that includes at least one drum stand having three or more feet and at least one foot pedal, the set of marking strips including two or more marking strips having a first side comprising a connecting material configured to removably engage a complementary connecting material on a drum mat, each of the two or more marking strips including a first edge extending in a first direction from a first corner to a second corner, a second edge extending in a second direction different from the first direction from the first corner to a third corner, and a third edge extending in the first direction from the third corner to a fourth corner, each of the two or more marking strips configured to indicate a periphery of the at least one drum stand, and wherein at least one of the two or more marking strips has a second side comprising one or more indicia visually indicative of a percussion instrument.

2. The footprint indication kit of claim 1, wherein the connecting material comprises hook fasteners.

3. The footprint indication kit of claim 2, wherein the hook fasteners substantially span the first side of at least one of the marking strips included in the set of marking strips.

4. The footprint indication kit of claim 1, wherein the set of marking strips is configured to outline at least a footprint of the drum stand having three or more feet, and the set of marking strips includes at least three marking strips having one or more curved edges.

5. The footprint indication kit of claim 1, wherein the set of marking strips is configured to outline at least a footprint of the foot pedal and includes one or more shorter marking strips having one or more straight edges and one or more longer marking strips having one or more straight edges.

6. The footprint indication kit of claim 5, wherein the shorter marking strips and the longer marking strips have a width greater than or equal to 0.75 inches.

7. The footprint indication kit of claim 1, wherein at least one of the marking strips included in the set of marking strips has a second side comprising a non-looped material substantially spanning the second side.

8. A footprint indication kit for percussion instruments, the footprint indication kit comprising:
a first set of marking strips configured to indicate a periphery of at least one foot pedal, the first set of marking strips including two or more marking strips having a first side comprising a connecting material configured to removably engage a complementary connecting material on a drum mat, each of the two or more marking strips including one or more straight edges; and a second set of marking strips configured to indicate a periphery of at least one drum stand having three or more feet, the second set of marking strips including three or more marking strips having a first side comprising the connecting material configured to removably engage the complementary connecting material on the drum mat, each of the three or more marking strips including a first edge extending in a first direction from a first corner to a second corner, a second edge extending in a second direction different from the first direction from the first corner to a third corner, and a third edge extending in the first direction from the third corner to a fourth corner wherein at least one of the marking strips in the first set of marking strips or at least one of the marking strips in the second set of marking strips includes a second side comprising one or more indicia visually indicative of a percussion instrument.

9. The footprint indication kit of claim 8, wherein the connecting material comprises hook fasteners.

10. The footprint indication kit of claim 9, wherein the hook fasteners substantially span the first side of at least one of the marking strips included in the first set of marking strips and at least one of the marking strips included in the second set of marking strips.

11. The footprint indication kit of claim 8, wherein at least one of the marking strips in the first set of marking strips and at least one of the marking strips in the second set of marking strips include a second side comprising one or more indicia visually indicative of a percussion instrument.

12. The footprint indication kit of claim 8, wherein at least one of the marking strips in the first set of marking strips includes a second side comprising a first indicia visually indicative of the foot pedal, and at least one of the marking strips in the second set of marking strips includes a second side comprising a second indicia visually indicative of the drum stand.

13. The footprint indication kit of claim 8, wherein the two or more marking strips of the first set of marking strips include one or more shorter marking strips having one or more straight edges and one or more longer marking strips having one or more straight edges.

14. The footprint indication kit of claim 13, wherein a width of the one or more shorter marking strips and the one or more longer marking strips is greater than or equal to 0.75 inches, a length of the one or more shorter marking strips is greater than or equal to 2 inches, and a length of the one or more longer marking strips is greater than or equal to 8 inches.

15. The footprint indication kit of claim 8, wherein the three or more marking strips of the second set of marking strips each have one or more curved edges.

16. A footprint indication kit for percussion instruments, the footprint indication kit comprising:

a first set of marking strips configured to indicate a periphery of at least one foot pedal, the first set of marking strips including two or more marking strips having a first side comprising a connecting material configured to removably engage a complementary connecting material on a drum mat, each of the two or more marking strips including one or more straight edges, the two or more marking strips including one or more shorter marking strips having one or more straight edges and one or more longer marking strips having one or more straight edges, wherein a width of the one or more shorter marking strips and the one or more longer marking strips is greater than or equal to 0.75 inches, and a length of the one or more shorter marking strips is greater than or equal to 2 inches; and a second set of marking strips configured to indicate a periphery of at least one drum stand having three or more feet, the second set of marking strips including three or more marking strips having a first side comprising the connecting material configured to removably engage the complementary connecting material on the drum mat, each of the three or more marking strips including a first edge extending in a first direction from a first corner to a second corner, a second edge extending in a second direction different from the first direction from the first corner to a third corner, and a third edge extending in the first direction from the third corner to a fourth corner.

17. The footprint indication kit of claim 16, wherein
each of the two or more foot pedal marking strips have one or more straight edges; and
each of the three or more drum stand marking strips have one or more curved edges.

18. The footprint indication kit of claim 6, wherein a length of the one or more shorter marking strips is greater than or equal to 2 inches.

19. The footprint indication kit of claim 16, wherein at least one of the marking strips in the first set of marking strips includes a second side comprising a first indicia visually indicative of the foot pedal, and at least one of the marking strips in the second set of marking strips includes a second side comprising a second indicia visually indicative of the drum stand.

* * * * *